US012688467B2

(12) United States Patent
Thakkar et al.

(10) Patent No.: US 12,688,467 B2
(45) Date of Patent: Jul. 21, 2026

(54) ASCERTAINING AND/OR MITIGATING EXTENT OF EFFECTIVE RECONSTRUCTION, OF PREDICTIONS, FROM MODEL UPDATES TRANSMITTED IN FEDERATED LEARNING

(71) Applicant: GOOGLE LLC, Mountain View, CA (US)

(72) Inventors: Om Dipakbhai Thakkar, San Jose, CA (US); Trung Dang, Los Angeles, CA (US); Swaroop Indra Ramaswamy, Belmont, CA (US); Rajiv Mathews, Sunnyvale, CA (US); Françoise Beaufays, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1105 days.

(21) Appl. No.: 17/535,405

(22) Filed: Nov. 24, 2021

(65) Prior Publication Data

US 2022/0383204 A1      Dec. 1, 2022

Related U.S. Application Data

(60) Provisional application No. 63/194,663, filed on May 28, 2021.

(51) Int. Cl.
G06N 20/20          (2019.01)

(52) U.S. Cl.
CPC .................................... G06N 20/20 (2019.01)

(58) Field of Classification Search
CPC .......... G06N 20/20; G06N 20/00; G06N 3/04; G06N 3/063; G06N 3/08
See application file for complete search history.

(56) References Cited

U.S. PATENT DOCUMENTS

| | | | |
|---|---|---|---|
| 2019/0385043 A1* | 12/2019 | Choudhary | ............ G06N 20/00 |
| 2021/0073678 A1* | 3/2021 | Chu | ........................ G06N 20/00 |

OTHER PUBLICATIONS

Wei, Wenqi, et al. "A framework for evaluating gradient leakage attacks in federated learning." arXiv preprint arXiv:2004. 10397 (2020). (Year: 2020).*

(Continued)

*Primary Examiner* — Kamran Afshar
*Assistant Examiner* — Brian J Hales
(74) *Attorney, Agent, or Firm* — Gray Ice Higdon

(57)          ABSTRACT

Implementations relate to ascertaining to what extent predictions, generated using a machine learning model, can be effectively reconstructed from model updates, where the model updates are generated based on those predictions and based on applying a particular loss technique (e.g., a particular cross-entropy loss technique). Some implementations disclosed generate measures that each indicate a degree of conformity between a corresponding reconstruction, generated using a corresponding model update, and a corresponding prediction. In some of those implementations, the measures are utilized in determining whether to utilize the particular loss technique (utilized in generating the model updates) in federated learning of the machine learning model and/or of additional machine learning model(s).

20 Claims, 6 Drawing Sheets

(56) References Cited

OTHER PUBLICATIONS

Singhal, Karan, et al. "Federated Reconstruction: Partially Local Federated Learning." arXiv preprint arXiv:2102.03448 (2021). (Year: 2021).*

He, K. et al., "Deep Residual Learning for Image Recognition;" Proceedings of the IEEE Conference on Computer Vision and Patter Recognition (CVPR); pp. 770-778, 2016.

Hochreiter et al. "Long Short-Term Memory." Neural computation 9, No. 8 (1997): pp. 1735-1780; dated 1997.

Bahdanau, Dzmitry et al. "Neural Machine Translation by Jointly Learning to Align and Translate," arXiv preprint arXiv:1409.0473, 2014—arxiv.org, ICLR 2015; dated May 19, 2016.

Deng, J. et al. "Imagenet: A Large-Scale Hierarchical Image Database." In Computer Vision and Pattern Recognition (CVPR); IEEE; pp. 248-255; dated 2009.

Abadi, et al.; Tensorflow: A system for Large-scale Machine Learning; In USENIX Symposium on Operating Systems Design and Implementation (OSDI), 20 Pages; dated 2016.

Chorowski, J. et al., "Attention-Based Models for Speech Recognition," in Proceedings of the 28th International Conference on Neural Information Processing Systems, vol. 28; 9 pages; dated Dec. 2015.

Shen, J. et al., "Lingvo: A Modular and Scalable Framework for Sequence-to-Sequence Modeling"; CoRR, arXiv:1902.08295; 17 pages; dated 2019.

Panayotov, V. et al., "Librispeech: An ASR Corpus Based on Public Domain Audio Books," in Acoustics, Speech and Signal Processing (ICASSP); IEEE International Conference; pp. 5206-5210; dated 2015.

Zhu, L. et al, "Deep Leakage from Gradients"; In Advances in Neural Information Processing Systems (NeurIPS2019); 11 pages; dated 2019.

Mcmahan, B. et al., "Federated Learning: Collaborative Machine Learning without Centralized Training Data"; Google AI Blog; retrieved from Internet at https://ai.googleblog.com/2017/04/federated-learning-collaborative.html; 4 pages; dated Apr. 6, 2017.

Melis, L. et al., "Exploiting Unintended Feature Leakage in Collaborative Learning"; In 2019 IEEE Symposium on Security and Privacy (SP), pp. 691-706; dated 2019.

Shokri, R. et al., "Membership Inference Attacks Against Machine Learning Models"; In 2017 IEEE Symposium on Security and Privacy (SP); pp. 3-18; dated 2017.

Geiping, J. et al. "Inverting Gradients—How easy is it to break privacy in federated learning?"; arXiv e-print; arXiv:2003.14053v2; 23 pages; dated Sep. 11, 2020.

Yin, H. et al., "See Through Gradients: Image Batch Recovery via GradInversion"; arXiv e-print; arXiv:2104.07586; 13 pages; dated Apr. 15, 2021.

Zhao, B. et al., "iDLG: Improved Deep Leakage from Gradients"; arXiv e-print; arXiv:2001.02610; 5 pages; dated Jan. 8, 2020.

Wainakh, A. et al., "Label Leakage from Gradients in Distributed Machine Learning"; In 2021 IEEE 18th Annual Consumer Communications & Networking Conference (CCNC); pp. 1-4; dated 2021.

Tan, M. et al, "EfficientNet: Rethinking Model Scaling for Convolutional Neural Networks"; in Proceedings of the 36th International Conference on Machine Learning; 10 pages; dated 2019.

Vepakomma, P. et al., "NoPeek: Information Leakage Reduction to Share Activations in Distributed Deep Learning"; In 2020 International Conference on Data Mining Workshops (ICDMW); pp. 933-942; dated 2020.

Chan, W. et al, "Listen, Attend and Spell: A Neural Network for Large Vocabulary Conversational Speech Recognition"; In 2016 IEEE International Conference on Acoustics, Speech and Signal Processing (ICASSP); pp. 4960-4964; dated 2016.

Mcmahan, B. et al, "Communication-Efficient Learning of Deep Networks from Decentralized Data"; In Artificial Intelligence and Statistics; 10 pages; dated 2017.

Sim, K.C. et al., "An Investigation into On-device Personalization of End-to-end Automatic Speech Recognition Models"; arXiv e-print; arXiv:1909.06678; 5 pages; dated Sep. 14, 2019.

Maas, A. et al., "Rectifier nonlinearities improve neural network acoustic models"; In Proceedings of the 30th International Conference on Machine Learning (ICML); 6 pages; dated 2013.

Clevert, D-A et al., Fast and Accurate Deep Network Learning by Exponential Linear Units (ELUs); arXiv preprint arXiv:1511. 07289; 14 pages; dated Dec. 3, 2015.

Ramachandran, P. et al., "Searching for Activation Functions"; arXiv e-print; arXiv:1710.05941v2; 13 pages; dated Oct. 27, 2017.

Elfwing, S. et al., "Sigmoid-Weighted Linear Units for Neural Network Function Approximation in Reinforcement Learning"; Neural Networks, 107; pp. 3-11; dated 2018.

Rosenblatt, F., "The Perceptron: A Probabilistic Model for Information Storage and Organization in the Brain"; Psychological Review, vol. 65, No. 6; pp. 386-408; dated 1958.

Seide, F. et al., "1-Bit Stochastic Gradient Descent and its Application to Data-Parallel Distributed Training of Speech DNNs"; In Fifteenth Annual Conference of the International Speech Communication Association (ISCA); pp. 1058-1062; dated 2014.

Bernstein, J. et al., "signSGD: Compressed Optimisation for Non-Convex Problems"; In International Conference on Machine Learning; 10 pages; dated 2018.

Karimireddy, S.P. et al., "Error Feedback Fixes SignSGD and other Gradient Compression Schemes"; In Proceedings of the 36th International Conference on Machine Learning; 10 pages; dated 2019.

Balles, L. et al., "The Geometry of Sign Gradient Descent"; arXiv.org, arXiv:2002.08056, 24 pages; dated 2019.

Jin, R. et al., "Stochastic-Sign SGD for Federated Learning with Theoretical Guarantees"; arXiv.org; arXiv:2002.10940v3; 32 pages; dated Jun. 11, 2020.

Aji, A.F. et al., "Sparse Communication for Distributed Gradient Descent"; arXiv.org; arXiv:1704.05021v2; 6 pages; dated Jul. 24, 2017.

Chen, C-Y. et al., "AdaComp: Adaptive Residual Gradient Compression for Data-Parallel Distributed Training"; In Proceedings of the 32nd AAAI Conference on Artificial Intelligence; pp. 2827-2835; dated 2018.

Gupta, O. et al., "Distributed Learning of Deep Neural Network Over Multiple Agents"; Journal of Network and Computer Applications; arXiv.org; arXiv.1810.06060; 21 pages; dated 2018.

European Patent Office; International Search Report and Written Opinion issued in Application No. PCT/US2021/063122; 10 pages; dated May 3, 2022.

Wei W. et al.; A Framework for Evaluating Gradient Leakage Attacks in Federated Learning; Georgia Institute of Technology; 25 pages; dated Apr. 22, 2020.

Dang T. et al.; A Method to Reveal Speaker Identity in Distributed ASR Training, and How to Counter it; 16 pages; dated Apr. 15, 2021.

Bhowmick A. et al.; Protection Against Reconstruction and Its Applications in Private Federated Learning; ML Privacy Team, Apple, Inc.; 45 pages; dated Dec. 3, 2018.

Chinese Patent Office, First Office Action issued in Application No. 202180088371.8, 6 pages, dated Dec. 18, 2025.

European Patent Office, Intention to Grant issued in Application No. 21844108.7, 49 pages, dated Apr. 17, 2026.

* cited by examiner

200

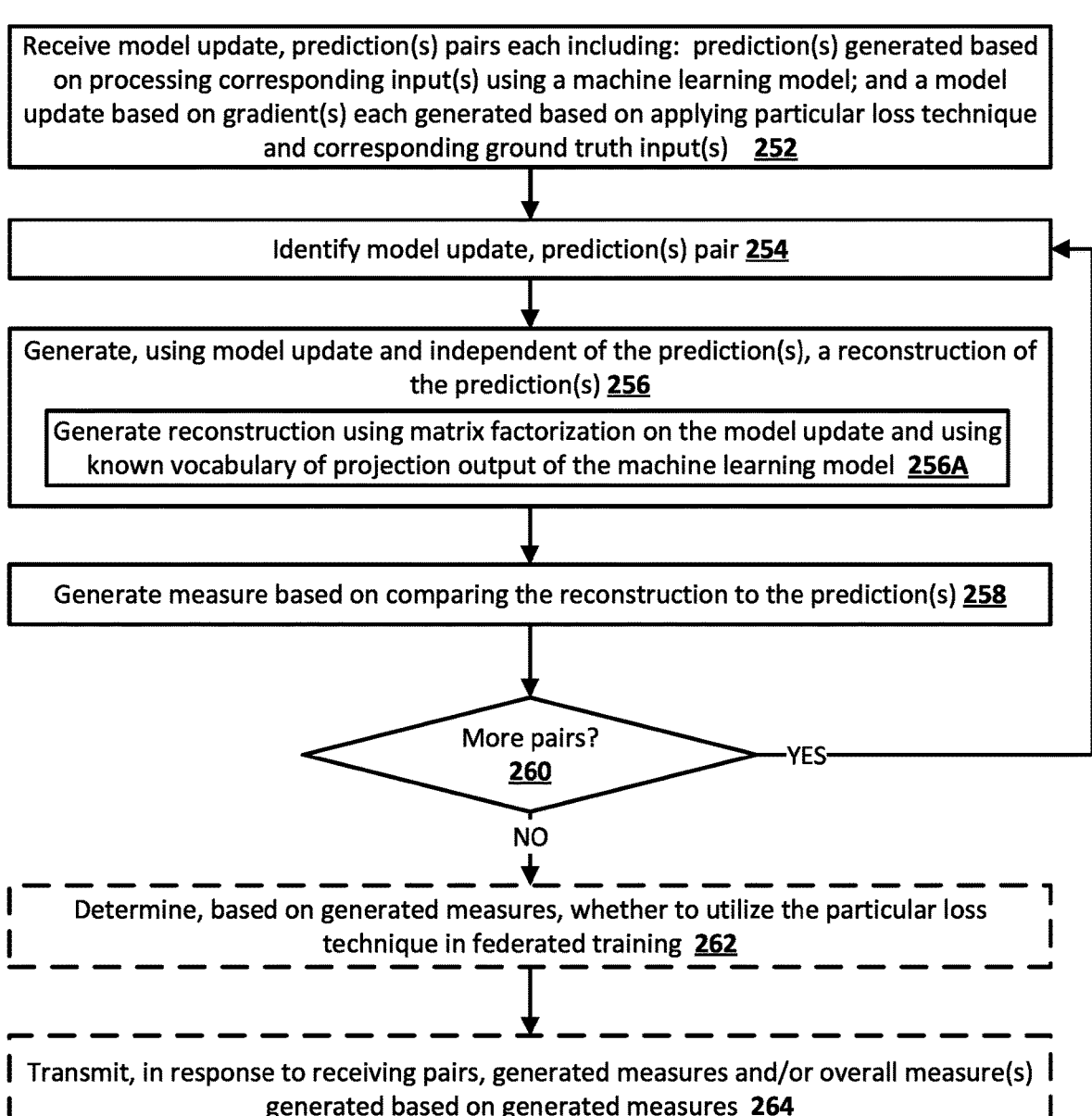

Receive model update, prediction(s) pairs each including:  prediction(s) generated based on processing corresponding input(s) using a machine learning model; and a model update based on gradient(s) each generated based on applying particular loss technique and corresponding ground truth input(s)   252

Identify model update, prediction(s) pair 254

Generate, using model update and independent of the prediction(s), a reconstruction of the prediction(s) 256

Generate reconstruction using matrix factorization on the model update and using known vocabulary of projection output of the machine learning model  256A

Generate measure based on comparing the reconstruction to the prediction(s) 258

More pairs?
260

—YES

NO

Determine, based on generated measures, whether to utilize the particular loss technique in federated training 262

Transmit, in response to receiving pairs, generated measures and/or overall measure(s) generated based on generated measures 264

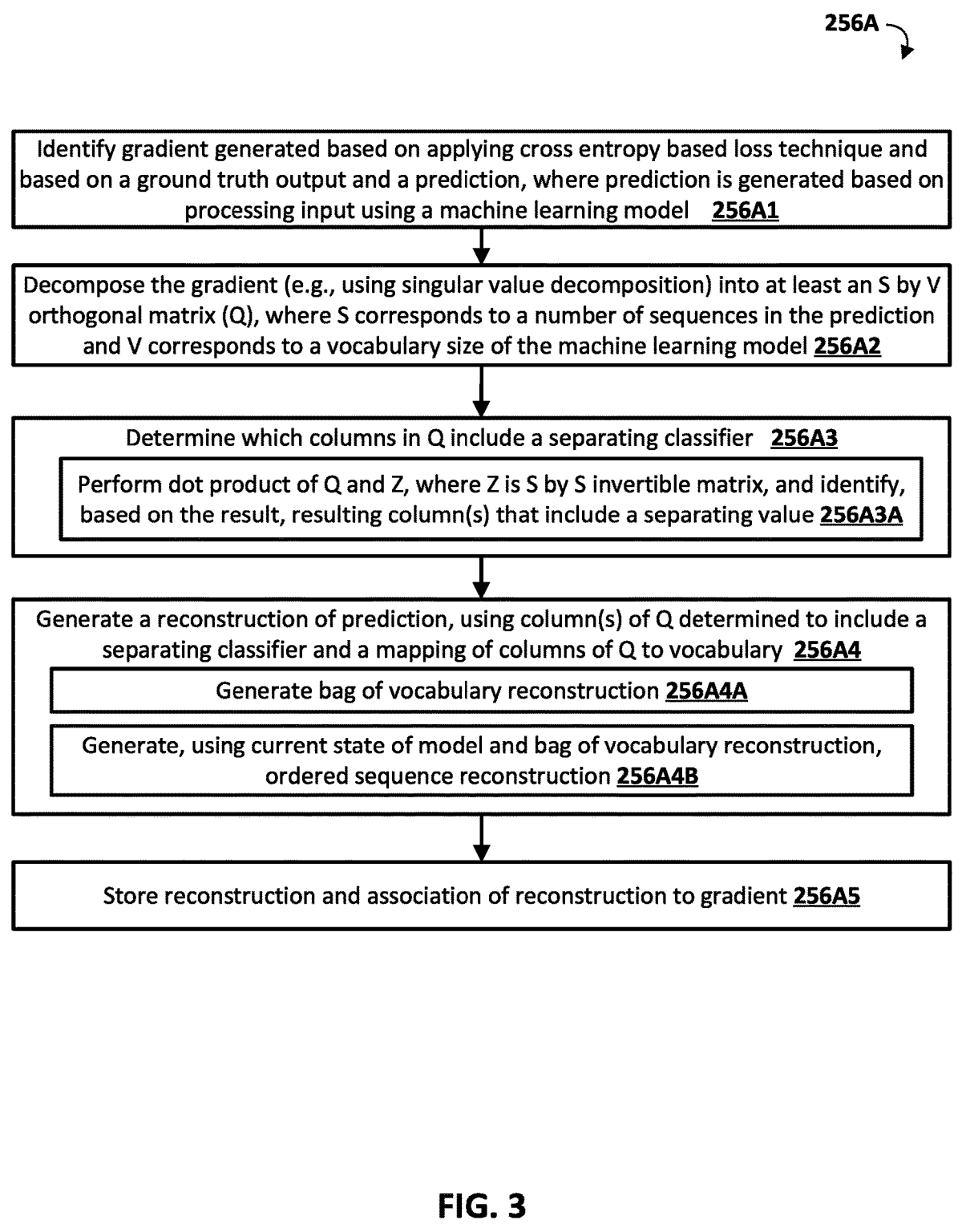

Identify gradient generated based on applying cross entropy based loss technique and based on a ground truth output and a prediction, where prediction is generated based on processing input using a machine learning model  256A1

Decompose the gradient (e.g., using singular value decomposition) into at least an S by V orthogonal matrix (Q), where S corresponds to a number of sequences in the prediction and V corresponds to a vocabulary size of the machine learning model 256A2

Determine which columns in Q include a separating classifier  256A3

Perform dot product of Q and Z, where Z is S by S invertible matrix, and identify, based on the result, resulting column(s) that include a separating value 256A3A

Generate a reconstruction of prediction, using column(s) of Q determined to include a separating classifier and a mapping of columns of Q to vocabulary  256A4

Generate bag of vocabulary reconstruction 256A4A

Generate, using current state of model and bag of vocabulary reconstruction, ordered sequence reconstruction 256A4B

Store reconstruction and association of reconstruction to gradient 256A5

FIG. 3

ASCERTAINING AND/OR MITIGATING EXTENT OF EFFECTIVE RECONSTRUCTION, OF PREDICTIONS, FROM MODEL UPDATES TRANSMITTED IN FEDERATED LEARNING

BACKGROUND

Federated learning of machine learning (ML) model(s) is an increasingly popular ML technique for training ML model(s). In federated learning, an on-device ML model is stored locally on a client device of a user, and a global ML model, that is a cloud-based counterpart of the on-device ML model, is stored remotely at a remote system (e.g., a cluster of servers). The client device, using the on-device ML model, can process input detected at the client device to generate a prediction, and can compare the prediction to ground truth output to generate a client gradient. Further, the client device can transmit, to the remote system, a client model update that is based on the client gradient. For example, the client model update can be the client gradient or can be based on the client gradient and additional generated client gradient(s). For instance, the client model update can be generated from a mini-batch of client gradients (e.g., 1-step, N-samples), from client gradients over several steps (e.g., N-steps, 1-sample each), or, more generally, based on gradients from K-step(s) with N-sample(s) at each step. The remote system can utilize the client model update, and optionally additional client model updates generated in a similar manner at additional client devices, to update weights of the global ML model. The remote system can transmit the global ML model, or updated weights of the global ML model, to the client device and/or to other client devices. Each client device can then replace the on-device ML model with the global ML model, or replace the weights of the on-device ML model with the updated weights of the global ML model, thereby updating the on-device ML model.

Accordingly, federated learning enables a client device to transmit a locally generated model update, without transmitting the underlying data utilized to generate the model update (i.e., without transmitting the corresponding input(s), prediction(s), or ground truth output(s)). Further, the remote system can effectively update the global ML model utilizing the model update, and without any need to access or utilize the underlying data. In these and other manners, federated learning can provide a degree of data security by obviating the need to transmit the underlying (and potentially sensitive) data and instead transmitting only the model update generated based on such data. However, to ensure data security and/or increase the degree of data security, it is important that at least some (e.g., all, more than half, etc.) generated model updates cannot be reverse engineered to reveal information regarding the underlying data utilized to generate the model update (e.g., to reveal the input(s), the prediction(s), and/or the ground truth output(s)).

SUMMARY

Implementations disclosed herein relate to various techniques for ascertaining to what extent predictions, generated using a machine learning model, can be effectively reconstructed from model updates, where the model updates are generated based on those predictions and based on applying a particular loss technique (e.g., a particular cross-entropy loss technique). For the sake of simplicity, some examples described herein will be described with respect to a model update that is a single gradient. However, as described herein, implementations disclosed herein can be utilized in conjunction with model updates that are based on multiple gradients.

As an example, the predictions can each be a probability distribution or a sequence of probability distributions and the gradients can each be generated based on applying a cross-entropy based loss technique in view of the prediction and in view of a corresponding ground truth one-hot vector (when the prediction is the probability distribution) or a corresponding sequence of ground truth one-hot vectors (when the prediction is the sequence of probability distributions). Continuing with the example, a corresponding reconstruction of each of the predictions can be generated using matrix factorization on the gradient and using a known vocabulary of a projection output layer of the machine learning model. More generally, a corresponding reconstruction of each model update can be generated using matrix factorization on the model update and using a known vocabulary of the projection output layer.

In some implementations, each reconstruction of a model update can include, for example, a bag of vocabulary reconstruction (e.g., a bag of words reconstruction when the vocabulary elements include words or word pieces) that reconstructs the vocabulary elements of the prediction(s) used in generating the model update, but not necessarily their order. Such reconstructions can each be generated using the model update and the known vocabulary, and without any reference to corresponding current weights of the machine learning model when the corresponding prediction(s) were generated and/or without reference to any other feature(s). In some implementations, each reconstruction can additionally or alternatively include an ordered sequence reconstruction. In some of those implementations, the ordered sequence reconstruction can be generated using a language model (or other model(s) that dictate probabilities of various sequences of the vocabulary elements) and optionally without reference to corresponding current weights of the machine learning model. For example, the language model can be utilized to determine which, of multiple candidate ordered sequences of the bag of vocabulary reconstruction, is most probable, and that candidate ordered sequence utilized as the ordered sequence reconstruction. As another example, the ordered sequence reconstructions can be generated based on the bag of vocabulary reconstruction and further based on the corresponding current weights of the machine learning model when the corresponding prediction(s) were generated. Optionally, in such an example, a gradients matching reconstruction technique and/or other reconstruction technique(s), that rely on corresponding current weights, can be utilized in generating the ordered sequence reconstructions. However, it is noted that such reconstruction techniques can be used with a search space that is constrained in view of (e.g., constrained to) the bag of vocabulary reconstruction. This can enable such reconstruction techniques to be performed more efficiently (i.e., with less utilization of processor resources) and/or to be more accurate (i.e., by constraining the search space to the resolved bag of vocabulary reconstruction).

Some implementations disclosed herein generate measures that each indicate a degree of conformity between a corresponding reconstruction, generated using a corresponding model update, and corresponding prediction(s). The measures collectively reflect how effectively predictions can be generated from model update generated using the particular loss technique. Accordingly, the measures and/or an overall measure generated based on the measures, can indicate a degree of data security that is provided by the gradients generated using the particular loss technique.

In some of those implementations, the measures are utilized in determining whether to utilize the particular loss technique (utilized in generating the gradients) in federated learning of the machine learning model and/or of additional machine learning model(s). For example, the measures, and/or overall measure(s) generated based on the measures, can be compared to threshold(s) and the particular loss technique utilized in federated learning only when the measures and/or overall measure(s) satisfy the threshold(s). As an additional example, the measures and/or overall measure(s) that are generated based on model updates generated utilizing a particular loss technique can additionally or alternatively be compared to alternate measures and/or alternate overall measures that are each generated based on model updates generated utilizing a corresponding alternative particular loss technique. In such an additional example, the particular loss technique can be utilized only when the comparison indicates that the particular loss technique provides a greater degree of data security than the alternate particular loss technique(s). For instance, the particular loss technique can be cross-entropy loss with sign gradient descent, an alternate loss technique can be cross-entropy loss with adaptive federated optimization, an additional alternate loss can be cross-entropy loss with gradient sparsification, and a further additional alternate loss technique can be cross-entropy loss without any gradient modification technique. The particular loss technique can be utilized only when its measure(s) are more indicative of data security than the measure(s) for the alternate loss technique, the measure(s) for the additional alternate loss technique, and the measure(s) for the further additional loss technique. In these and other manners, a certain degree of data security that is provided by gradients, generated using the particular loss technique, can be ensured prior to utilization of the particular loss technique in federated learning. This can mitigate occurrences of a potentially nefarious actor being able to effectively reconstruct intercepted model updates and/or can prevent those actors from being able to differentiate between effective and ineffective reconstructions of intercepted model updates.

In some additional or alternative implementations, a request that is transmitted by a computing device can be received over one or more networks and the request can include model update, prediction(s) pairs. The model update of the pairs can each be generated based on the prediction(s) of the pair and based on applying a particular loss technique. In those implementations, a reconstruction for each pair can be generated based on the model update of the pair, and measure(s) then generated that indicates a degree of conformity between the reconstruction and the prediction(s) of the pair. The measure(s) can reflect how effectively (e.g., whether and/or to what extent) the reconstruction conforms to the prediction(s). For example, if the reconstruction is a bag of vocabulary reconstruction, the measure(s) can include: a measure that indicates whether the bag of vocabulary reconstruction includes all elements of the prediction(s) and does not include any extra elements not in the prediction(s); and/or a measure that indicates a quantity of elements that differ between the bag of vocabulary reconstruction and the prediction(s) (e.g., a quantity of element(s) that are in the reconstruction but not the prediction(s) and a quantity of element(s) that are in the prediction(s) but not the reconstruction). As another example, if the reconstruction is an ordered sequence reconstruction, the measure(s) can include: a measure that indicates whether the reconstruction includes all elements of the prediction(s) and in the order of the prediction(s) and does not include any extra element(s) not in the prediction(s); and/or a measure that indicates an extent to which the reconstruction and the prediction(s) differ, if at all (e.g., an edit-distance based measure or other measure that reflects difference(s) in element(s) and/or order between the reconstruction and the prediction(s)). The generated measures, and/or overall measure(s) generated based on the measures, can be transmitted to the computing device in response to the request. In response to the transmission, the computing device can utilize the measure(s) and/or overall measure(s) in automatically determining whether to utilize the particular loss technique in federated learning and/or other machine learning model training. The transmission can additionally or alternatively cause the measures and/or overall measure(s) to be rendered (e.g., visually) at the computing device. This can enable user(s) of the computing device to ascertain (e.g., through viewing of the visual rendering) a degree a data security that is provided by the gradients and to determine, based on the degree, whether to utilize the particular loss technique in federated learning and/or other machine learning model training. In these and other manners, a certain degree of data security that is provided by gradients, generated using the particular loss technique, can be ensured prior to utilization of the particular loss technique in machine learning model training.

In various implementations, the machine learning model is one that includes a projection layer having a projection input layer, weight matrix layer(s), and a projection output layer. The projection input layer can accept a lower dimensional generated embedding as input and the weight matrix layer(s) can be used to process the generated embedding, using current weights of the weight matrix layer(s), to generate corresponding projection output of the projection output layer. The projection output layer has a size that conforms to a vocabulary for the machine learning model. Put another way, the quantity of output nodes of the projection output layer can conform to the vocabulary size and each node will correspond to a particular discrete element of the vocabulary. The output generated over the projection output layer can be, for example, a probability distribution over the vocabulary. When a sequence of inputs is applied to the projection input layer, a sequence of outputs can be generated over the projection output layer and will be of a size that conforms to the vocabulary and to a length of the input sequence.

As one example, when the machine learning model is an automatic speech recognition model (e.g., a listen-attend-spell LAS model), a sequence of audio data embeddings of dimension S by d (where S is the quantity of audio data embeddings and d is the dimension of each embedding) can be provided to the projection input layer and sequence and the projection output can be a sequence of outputs that are collectively of length S by V, where V is the vocabulary size. The elements of the vocabulary in such an example can be words or word pieces.

As another example, when the machine learning model is an image classification model, the embedding provided as input to the projection input layer can be an image embedding, of an image, of dimension d (where d is the dimension of the embedding) and the projection output can be of length V, where V is the vocabulary size. The elements of the vocabulary in such an example can be classifications. Additional and/or alternative machine learning models can be utilized that can include different vocabularies and/or can accept different types of embeddings as input.

Accordingly, various implementations set forth techniques to ensure at least a certain degree of security is afforded by a particular loss technique utilized in federated learning, and can be utilized to ensure that degree of security is afforded before the particular loss technique is utilized in federated learning of particular machine learning model(s). In these and other manners, security of data can be enhanced for various client devices that participate in the federated learning. This can enable the benefits of federated learning to be achieved, while ensuring a certain degree of security.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is a flowchart illustrating an example method of: generating, utilizing corresponding model updates, corresponding reconstructions of corresponding predictions utilized in generating the corresponding model updates; determining measures based on comparing the corresponding reconstructions to the corresponding model updates; and, optionally, performing one or more further actions based on the determined measures.

FIG. 3 is a flowchart illustrating an example method of generating a reconstruction of a prediction using matrix factorization on a corresponding gradient and using a known vocabulary of projection output of a machine learning model utilized in generating the prediction.

DETAILED DESCRIPTION

Figure 1:
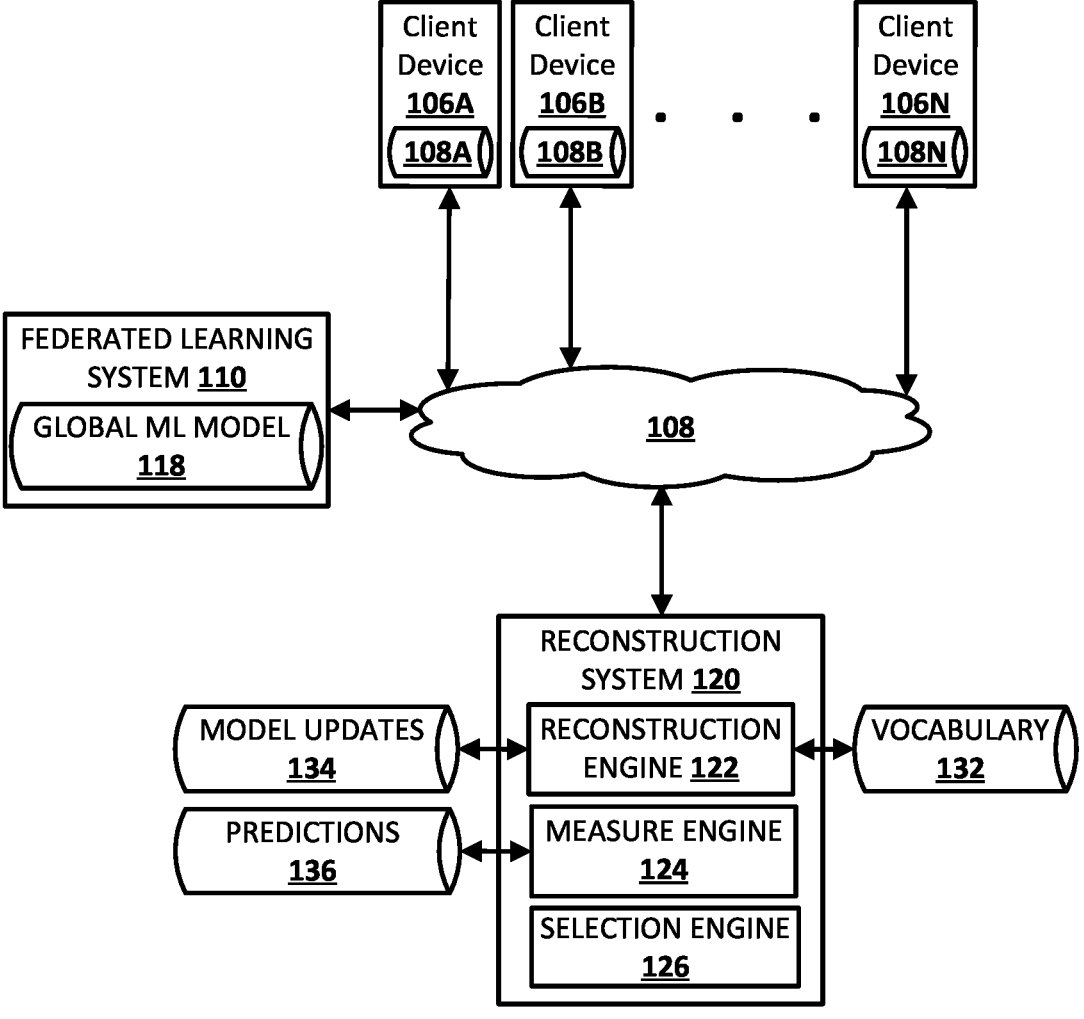
FIG. 1 illustrates an example environment in which implementations described herein can be implemented.

Before turning to the figures, a non-limiting overview is presented of some implementations of generating a reconstruction using a generated model update. Many deep learning models, such as classification models, include a fully-connected layer to map a d-dimensional representation extracted from an input h to a C-dimensional vector z. The vector z represents the unnormalized log probabilities of its class, and Cis the number of classes. This fully-connected layer is referred to herein as the projection layer. The probability distribution over all classes $\hat{y}$ is derived by applying the softmax function on z:

$$\hat{y}_i = \frac{\exp(z_i)}{\sum_j \exp(z_j)}.$$

Training such a model usually involves minimizing the cross-entropy loss, as represented by $$\mathcal{L} = -\sum_i y_i \log \hat{y}_i = -\log \frac{\exp z_{y_C}}{\sum_{j \in C} \exp z_j}.$$

Assume W and b represent the weight and the bias of the projection layer, respectively. Since z=Wh+b, this results in $$\frac{\partial z}{\partial W} = h^T.$$

Further assume $$g = \frac{\partial \mathcal{L}}{\partial z}.$$

With these assumptions, the model update for the projection layer can be represented by equation (1):

$$\Delta W = \frac{\partial \mathcal{L}}{\partial W} = \frac{\partial \mathcal{L}}{\partial z} \frac{\partial z}{\partial W} = h^T g \quad (1)$$

Equation (1) applies to a loss computed from a single sample with a single label. Since introducing a new label means adding a new term to the loss, equation (1) can be generalized to various settings. For example, a model update of a N-sample mini-batch or a sequence of length N is averaged from model updates computed from each sample in the batch or each label in the sequence. In such a scenario, equation (1) can be generalized by equation (2):

$$\Delta W = \frac{1}{N} \sum_{i=1}^{N} h_i^T g_i = H^T G \quad (2)$$

In equation (2), $$H = \frac{1}{N}[h_1, \dots, h_N] \text{ and } G = [g_1, \dots, g_N].$$

As another example, a model update after K steps is the sum of the model update at each of the K steps. In such a scenario, equation (1) can be generalized by equation (3):

$$\Delta W = \sum_{i=1}^{K} a_i \Delta W_{(i)} = \sum_{i=1}^{K} a_i H_{(i)}^T G_{(i)} = H^T G \quad (3)$$

In equation (3), $\Delta W_{(t)}$ and $\alpha_i$ are the softmax gradient and learning rate at the time step i, respectively, H= $[\alpha_i H_{(1)}, \dots, \alpha_K H_K]$, and G=$[G_{(1)}, \dots, G_K]$.

In all of these scenarios, $\Delta W$ can be represented as the product of two lower-rank matrices $H^T \in \mathbb{R}^{d \times S}$ and G $\in \mathbb{R}^{S \times C}$, where S is the number of terms used to compute the model update $\Delta W$. For example, if the model update is computed from a batch, S is the batch size. As another example, if the model update is aggregated from several step updates, S is the total numbers of samples at these steps.

In many implementations, in large-scale deep learning models, d and C are in the order of thousands. Accordingly, in those implementations it can be assumed that S<min{d, C}. Since H and G are usually full-rank matrices and their rows and columns have no linear dependency, this quantity S can be inferred from the rank of the weight matrix update, i.e. S=rank(ΔW). Therefore, an entity seeking to reconstruct predictions based on model updates can already know the number of labels (including repetitions) from the knowledge of ΔW. This is especially helpful, for example, when ΔW is computed from a sequence of labels. In that situation, the length of the sequence is immediately revealed to the entity given access to ΔW.

The softmax cross-entropy loss is defined on the output of the projection layer Z and ground-truth labels $$y: \mathcal{L} = \sum_{i=1}^{S} -$$

log softmax $z_i^{y_i}$. Differentiating $\mathbb{R}$ with respect to z yields:

$$g_i^j = \nabla z_i^j = \frac{\partial \mathcal{L}}{\partial z_i^j} = \begin{cases} -1 + \text{softmax}(z_i^j) & \text{if } j = \mathcal{Y}_i \\ \text{softmax}(z_i^j) & \text{otherwise} \end{cases} \quad (4)$$

Since the softmax function always returns a value in (0, 1), each row in G has a unique negative coordinate corresponding to the ground-truth label. Stated formally, let Neg(u) define the indices of negative coordinates in a vector u. Each row $g_i$ in G satisfies that $\text{Neg}(g_i)=\{\mathcal{Y}_i\}$. This observation is intuitive, since in order to minimize the loss, the probability of the ground-truth label should be pushed to 1, and probabilities of other labels should be pushed to 0. This observation hints that labels can be revealed from information about G.

Using singular value decomposition (SVD), ΔW can be decomposed into P Σ Q, where $P \in \mathbb{R}^{d \times s}$ and $Q \in \mathbb{R}^{s \times c}$ are orthogonal matrices, and $\Sigma \in \mathbb{R}^{S \times S}$ is diagonal matrix with non-negative elements on the diagonal.

Assume that there is a sample with label c. There exists a vector $r \in \mathbb{R}^N$ such that $rq^c<0$ and $rq^{j \neq c}>0$, or $\text{Neg}(rq)=\{c\}$. In other words, the subspace rx=0 separates the point $q^c$ from other points $q^{j \neq c}$ in the S-dimensional space.

If a label c appears in the batch, $\mathcal{Y}_i=c$ for some i, or $\text{Neg}(g_i)=\{c\}$. If $r=g_i Q^T$, then $rQ=g_i$, or $\text{Neg}(rQ)=\{c\}$. This means if a label c appears in the batch, there exists a linear classifier without bias that separates $q^c$ from $q^{j \neq c}$ The problem of finding a perfect classifier can be solved via linear programming. If there exists a classifier that separates $q^c$ from $q^{j \neq c}$, the following problem has a solution.

$$LP(c): \min_{r \in \mathbb{R}^N} rq^c \quad (5)$$

$$\text{s.t.} \quad rq^c \leq 0$$

$$rq^j \geq 0, \forall j \neq c$$

In practice, solving LP(c) for each c may take time, as the number of words in the vocabulary may be large. In view of observing that many columns in Q are clearly inseparable, a screening round can be applied to filter inseparable columns. Consider each columns in Q as a data point in a S-dimensional space, the screening round returns all points that are separable from a sampled subset of remaining points (e.g., using the Perceptron algorithm). This can be significantly faster and/or more computationally efficient than solving the LP problem.

The below algorithm provides an overview of some implementations of obtaining a set of labels (i.e., a bag of vocabulary) from a model update.

```
Input: Model update of the projection layer ΔW ∈ ℝ^{d×V}
N ← rank(ΔW)
Find Q ∈ ℝ^{S×V} the right singular matrix of ΔW
for i = 1 to C do
  S = ∅
  if LP(i) has a solution then
    Add label i into S
  end if
end for
Return: Number of labels used to
compute the update S, set of labels S
```

Turning now to the Figures, FIG. 1 illustrates an example environment in which implementations described herein can be implemented. The example environment includes client devices 106A-N, a federated learning system 110, a reconstruction system 120, and one or more networks 108. The client devices 106A-N, the federated learning system 110, and/or the reconstruction system 120 can communicate with one another via the network(s) 108. The network(s) 108 can include wide area network(s) (WAN(s)) (e.g., the Internet) and/or local area network(s) (LAN(s)).

The client devices 106A-N can include a client device via which a user can interact with the reconstruction system 120, which can be located remote from the client device (in other implementations reconstruction system 120 can be implemented in whole or in part on the client device). For example, the user can interact with client device 108A (via user interface input device(s) of the client device 108A) to cause the client device to transmit model update, prediction(s) pairs to reconstruction system 120. In response to such a transmission, the reconstruction system 120 can generate measure(s) based on the transmitted pairs and then transmit the measure(s) to the client device 108A. In response to receiving the measure(s), the client device 108A can utilize the measure(s) and/or overall measure(s) in automatically determining whether to utilize the particular loss technique in federated learning and/or other machine learning model training. In response to receiving the measure(s), the client device 108A can additionally or alternatively cause the measures and/or overall measure(s) to be rendered (e.g., visually) at the client device 108A. This can enable user(s) of the client device 108A to ascertain (e.g., through viewing of the visual rendering via a screen of the client device 108A) a degree a data security that is provided by the gradients and to determine, based on the degree, whether to utilize the particular loss technique in federated learning and/or other machine learning model training.

As another example, the user can interact with client device 108A (via user interface input device(s) of the client device 108A) to cause the client device to transmit model updates to reconstruction system 120. In response to such a transmission, the reconstruction system 120 can generate reconstructions that each correspond to one of the transmitted model updates, and then transmit, to the client device 108A, the reconstructions and indications of which reconstructions correspond to which model updates. In response to receiving the reconstructions and indications of which reconstructions correspond to which model updates, the client device 108A can generate measure(s) and/or overall measure(s) based on comparing the reconstructions to actual predictions that are stored locally at the client device 108A or otherwise accessible at the client device 108A. The client device 108A can match the received reconstructions to corresponding predictions based on the received indications of which reconstructions correspond to which model updates (e.g., using a locally stored mapping of the model updates to the predictions). Accordingly, in such an example, the client device 108A transmits only the model updates to the reconstruction system 120, without transmitting the predictions. Moreover, the reconstruction system 120 returns reconstructions generated based on the model updates, enabling the client device 108A to generate the measures based on the returned reconstructions.

The client devices 106A-N can additionally or alternatively include client devices that interact with the federated learning system 110 in participating in federated learning of a global machine learning (ML) model 118. For example, each of the client devices 106A-N is illustrated as including a corresponding one of local ML models 108A-N stored locally at the client device. The local ML models 108A-N are each a local counterpart to the global ML model 118, which is managed by the federated learning system 110.

In participating in federated learning, each of the client devices 106A-N, using its corresponding one of the on-device ML models 108A-N, can process corresponding input (e.g., an input based on user interface input detected at the client device and/or based on corresponding locally stored data at the client device) to generate a prediction, and can compare the prediction to ground truth output to generate a client gradient. For example, a cross-entropy based loss technique can be utilized in generating the client gradients. The ground truth output can be based on other data generated locally at the client device, and can optionally be based on user input(s) (e.g., that explicitly or implicitly confirm the prediction or that explicitly or implicitly indicate an alternate ground truth that is different from the prediction). Further, the client devices 106A-N can transmit model updates, that are based on their locally generated client gradients, to the federated learning system 110. Notably, the model updates can be transmitted to the federated learning system 110 without transmission of the predictions or the ground truth outputs that were utilized in generating the model updates.

The federated learning system 110 can utilize received client model updates, and optionally additional client model updates generated in a similar manner at additional client devices, to update weights of the global ML model 118. The federated learning system 110 can transmit the updated global ML model 118, or updated weights of the global ML model 118, to the client devices 108A-N and/or to other client devices. Each client device can then replace the on-device ML model with the updated global ML model, or replace the weights of the on-device ML model with the updated weights of the global ML model 118, thereby updating the on-device ML models. Further federated learning can optionally occur based on the updated on-device ML models, resulting in a further updated global ML model 118, which can again be provided (or weights thereof provided) with the client devices 106A-N. This process can continue for multiple iterations, optionally until the ML models are deemed final based on one or more conditions being satisfied. The federated learning system 110 can be implemented, for example, by one or more servers, such as a cluster of optionally distributed high-performance servers.

The client devices 106A-N can include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative client devices may be provided. Client devices 106A-N can each include one or more memories for storage of data and software applications, one or more processors for accessing data and executing applications, and other components that facilitate communication over a network.

The reconstruction system 120 can be implemented, for example, by a client device and/or by one or more servers, such as a cluster of optionally distributed high-performance servers. The reconstruction system 120 is illustrated in FIG. 1 as including a reconstruction engine 122, a measure engine 124, and a selection engine 126.

The reconstruction engine 122 processes model updates 134 and generates, for each of the model updates 134, a corresponding reconstruction. The model updates 134 processed at a given time can be provided by one of the client devices 106A, the federated learning system 110, or even locally generated by the reconstruction system 120. Further, the model updates 134 can optionally each be paired with corresponding one(s) of the predictions 136 as described herein (e.g., paired via mappings defining associations between corresponding model updates and predictions).

In generating a reconstruction based on one of the model updates 134, the reconstruction engine 122 can use matrix factorization on the model update and use a known vocabulary 132 of a projection output layer of a corresponding ML model. For example, where the model update is generated based on one of the local ML models 108A-N, a known vocabulary 132 of the projection output layer of the local ML models 108A-N can be used in generating the reconstruction. In some implementations, the known vocabulary 132 is provided by a developer or other user with knowledge of the vocabulary of the machine learning model (e.g., provided in or along with a request that includes corresponding gradients). In some other implementations, the known vocabulary 132 is determined from inspection of the machine learning model and/or from providing multiple known inputs to the machine learning model and inspecting corresponding predictions and/or model updates. Providing multiple known inputs to the machine learning model and inspecting corresponding predictions and/or model update enables resolution of which output dimensions correspond to which elements of the vocabulary. For example, since the prediction, that should be generated from the known input, is also known, it can be determined from the prediction and/or the model update, which output dimensions correspond to element(s) of the vocabulary for the prediction. Through utilization of multiple known inputs and corresponding known predictions, some, or all, of the vocabulary can be effectively derived through analysis of actually generated predictions and/or model updates.

In some implementations, the reconstruction engine 122 generates a reconstruction that includes, or is restricted to, a bag of vocabulary reconstruction that reconstructs the vocabulary elements of the prediction(s), but not necessarily their order. Put another way, the reconstruction seeks to reconstruct the vocabulary elements of the prediction(s) without regard to their order. While reconstruction could, by happenstance, include the vocabulary elements in the correct order, the reconstruction does not seek to determine the correct order. Such reconstructions can each be generated the reconstruction engine 122 using the model update and the known vocabulary, and without any reference to corresponding current weights of the machine learning model when the corresponding prediction was generated and/or without reference to any other feature(s). In some implementations, the reconstruction engine 122 can additionally or alternatively generate a reconstruction that is an ordered sequence reconstruction. The reconstruction engine 122 can generate the ordered sequence reconstruction based on the bag of vocabulary reconstruction and further based on a language model (or more generally, a vocabulary model) and/or based on the corresponding current weights of the machine learning model when the corresponding prediction was generated. In various implementations, in generating a reconstruction, the reconstruction engine 122 performs some or all aspects of step 256A of FIG. 3 (described below).

The measure engine 124 compares reconstructions, generated by the reconstruction engine, to their corresponding predictions 136, and generates measure(s) based on the comparisons. For example, the measure engine can compare a generated reconstruction, generated based on a given one of the model updates 134, to a given one of the predictions 136 that is indicated as paired with the given one of the model updates 134. The given one of the predictions 136 can be prediction(s) that were actually generated, using the corresponding ML model, and that were utilized in generating the given one of the model updates 134 (e.g., based on comparing the prediction(s) to ground truth output(s)). The measure generated by the measure engine 124 for a reconstruction can reflect how effectively (e.g., whether and/or to what extent) the reconstruction conforms to the prediction(s). For example, if the reconstruction is a bag of vocabulary reconstruction, the measure engine 124 can generate a measure that is a "1.0" if the bag of vocabulary reconstruction includes all elements of the prediction(s) and does not include any extra elements not in the prediction(s), and that otherwise is a "0.0". As another example, if the reconstruction is a bag of vocabulary reconstruction, the measure engine 124 can additionally or alternatively generate a measure that is non-binary and that reflects a quantity of elements that differ between the bag of vocabulary reconstruction and the prediction(s). For instance, the measure can be "1.0" is no elements differ, "0.75" is one of four elements differ, "0.5" if three of six elements differ, "0.0" if all elements differ, and so forth. In addition, the measure engine 124 can also optionally generate overall measure(s) as a function of the individual measures for the reconstructions. For example, the overall measure(s) can include a mean of the individual measures, a median of the individual measures, a standard deviation the individual measures, and/or other overall measure(s) that are a function of the individual measures. In various implementations, in generating an individual measure, the measure engine 124 performs some or all aspects of step 258 of FIG. 2 (described below).

The selection engine 126 analyzes measure(s) (e.g., individual and/or overall), generated by the measures engine 124 for model updates generated according to a particular loss technique, in determining whether to utilize the particular loss technique (e.g., in federated learning of the corresponding machine learning model and/or of additional machine learning model(s)). Accordingly, in various implementations the selection engine 126 can determine whether to select the particular loss technique for usage or, instead, to select an alternative loss technique for usage.

In some implementations, the selection engine 126 compares the individual measures and/or overall measure(s), generated by the measures engine 124 for model updates generated according to a particular loss technique, to threshold(s). In those implementations, the selection engine 126 can determine whether to utilize the particular loss technique based at least in part (e.g., solely and/or based on other consideration(s)) based on whether the measures and/or overall measure(s) satisfy the threshold(s).

In some implementations, the selection engine 126 compares: (a) the individual measures and/or overall measure(s), generated by the measures engine 124 for model updates generated according to a particular loss technique to (b) alternate individual measures and/or alternate overall measure(s), generated by the measures engine 124 for alternate gradients generated according to an alternate particular loss technique. In those implementations, the selection engine 126 can determine whether to select the particular loss technique or, instead, the alternate particular loss technique, based on the comparison (e.g., solely based on the comparison or also based on the threshold being satisfied as described in the preceding paragraph). For example, the measures engine 124 can determine to select the particular loss technique for utilization only when the comparison indicates that the particular loss technique provides a greater degree of data security than the alternate particular loss technique(s). Although the preceding example is provided with respect to comparing corresponding measures for two different particular loss techniques, more than two particular loss techniques can be considered and the comparison (and resulting selection) can consider corresponding measures for all. In various implementations, the selection engine 126 performs some or all aspects of step 262 of FIG. 2 (described below).

FIG. 2 is a flowchart illustrating an example method 200 of: generating, utilizing corresponding model updates, corresponding reconstructions of corresponding predictions utilized in generating the corresponding gradients; determining measures based on comparing the corresponding reconstructions to the corresponding predictions; and, optionally, performing one or more further actions based on the determined measures. For convenience, the operations of the flowchart are described with reference to a system that performs the operations. This system may include various components of various computer systems, such as one or more components of reconstruction system 120 of FIG. 1. Moreover, while operations of process 200 are shown in a particular order, this is not meant to be limiting. One or more operations may be reordered, omitted, and/or added.

At block 252, the system receives model update, prediction(s) pairs. The model update, prediction(s) pairs each include: prediction(s) generated based on processing corresponding input(s) using a machine learning model; and a model update generated based on applying a particular loss technique and based on corresponding ground truth input(s) (e.g., generated based on gradient(s) each generated based on comparing the corresponding ground truth input(s) to the prediction(s). For example, the model update can be a single gradient generated based on comparing a single prediction and ground truth pair or can be a model update generated based on a batch of gradients generated based on comparing multiple predictions and their corresponding ground truths. The model update, prediction(s) pairs received at block 252 can be generated by a component of the system and received from that component, or can be received in a transmission, and via a network, from another system or client device.

At block 254, the system identifies a model update, prediction(s) pair from those received at block 252.

At block 256, the system generates, using the model update of the identified pair and independent of the prediction of the identified pair, a reconstruction of the prediction. In some implementations, block 256 includes sub-block 256A, in which the system generates the reconstruction using matrix factorization on the model update and using a known vocabulary of projection output of the machine learning model. One non-limiting particular example of block 256A is described below with respect to FIG. 3.

At block 258, the system generates a measure based on comparing the reconstruction, of block 256 for the pair, to the prediction(s) of the pair. The system can store (e.g., in ROM or RAM) the measure.

At block 260, the system determines whether there are any unprocessed model update, prediction(s) pairs. If so, the system proceeds back to block 254 and identifies an unprocessed pair. If not, the system optionally proceeds to optional block 262 and/or optional block 264. It is noted that, although shown serially in FIG. 2 for convenience, in various implementations the system can perform multiple iterations of blocks 254, 256, and 258 in parallel (i.e., each iteration being performed in parallel will involve processing a different pair).

At optional block 262, the system determines, based on the measures generated via multiple iterations of block 258 (e.g., retrieving them from RAM or ROM), whether to utilize the particular loss technique in federated training. In some implementations, the system determines whether to utilize the particular loss technique in federated training based on the measures themselves and/or based on overall measure(s) that are generated based on the individual measure generated via multiple iterations of block 258. In some implementations, the system determines to utilize the particular loss technique in federated training only when some (e.g., X % of) or all of the individual measures satisfy an individual threshold and/or only when some (e.g., X % of) or all of the overall measure(s) satisfy a corresponding overall threshold. In some additional or alternative implementations, the system determines whether to utilize the particular loss technique in federated training based on comparing the individual measures and/or overall measure(s), for the particular loss technique, to individual measures and/or overall measure(s) for one or more alternate particular loss techniques. The individual measures and/or overall measure(s) for an alternate particular loss technique can be generated based on performing blocks 252, 254, 256, and 258 based on pairs that include model updates generated using the alternate particular loss technique.

At optional block 264, the system transmits, in response to receiving the pairs at block 252, the individual measures generated via multiple iterations of block 258 and/or overall measure(s) generated based on the generated individual measures. For example, the pairs at block 252 can be received in a request from a server or a client device, and the system can transmit the individual measures and/or the overall measure(s) to the server or the client device. For instance, the individual measures and/or the overall measure(s) can be included in a graphical user interface that is generated by the system, and the graphical user interface transmitted to the client device. Transmitting of the graphical user interface to the client device can cause (e.g., after corresponding user input(s) at the client device) the client device to visually render the individual measures and/or overall measure(s).

FIG. 3 is a flowchart illustrating one non-limiting example of block 256A of FIG. 2.

At block 256A1, the system identifies a gradient. The gradient can be the model update from one of the pairs of FIG. 2. The gradient can optionally be generated based on applying a cross-entropy based loss technique and based on a ground truth output and a prediction. The prediction is one generated based on processing input using a machine learning model.

At block 256A2, the system decomposes the gradient into at least an S by V orthogonal matrix (Q), where S corresponds to a number of sequences in the prediction and V corresponds to a vocabulary size of the machine learning model. Each column, in the matrix Q, can represent an S-dimensional point that corresponds to an element in the vocabulary. In some implementations, the system can decompose the gradient into orthogonal matrix Q using singular value decomposition. For example, the system can use singular value decomposition to decompose the gradient into two orthogonal matrices, Q and P (which can also be an S by V matrix) and a diagonal matrix $\Sigma$.

At block 256A3, the system determines which columns in Q include a separating classifier. Block 256A3 can include sub-block 256A3A, in which the system performs a dot product of Q and Z, where Z is an S by S invertible matrix, and identifies, based on the result, resulting column(s) of Q that include a separating value (e.g., negative value). For example, at sub-block 156A3A, the system can identify, in the matrix $\nabla0$ that results from the dot product of Q and Z, row(s) that include a separating value (e.g., a negative value) and identify the column(s) of Q that have the same index value as the row(s). A row that has a separating value in the resulting matrix will indicate that the corresponding column of Q likewise has a separating value.

Figure 5:
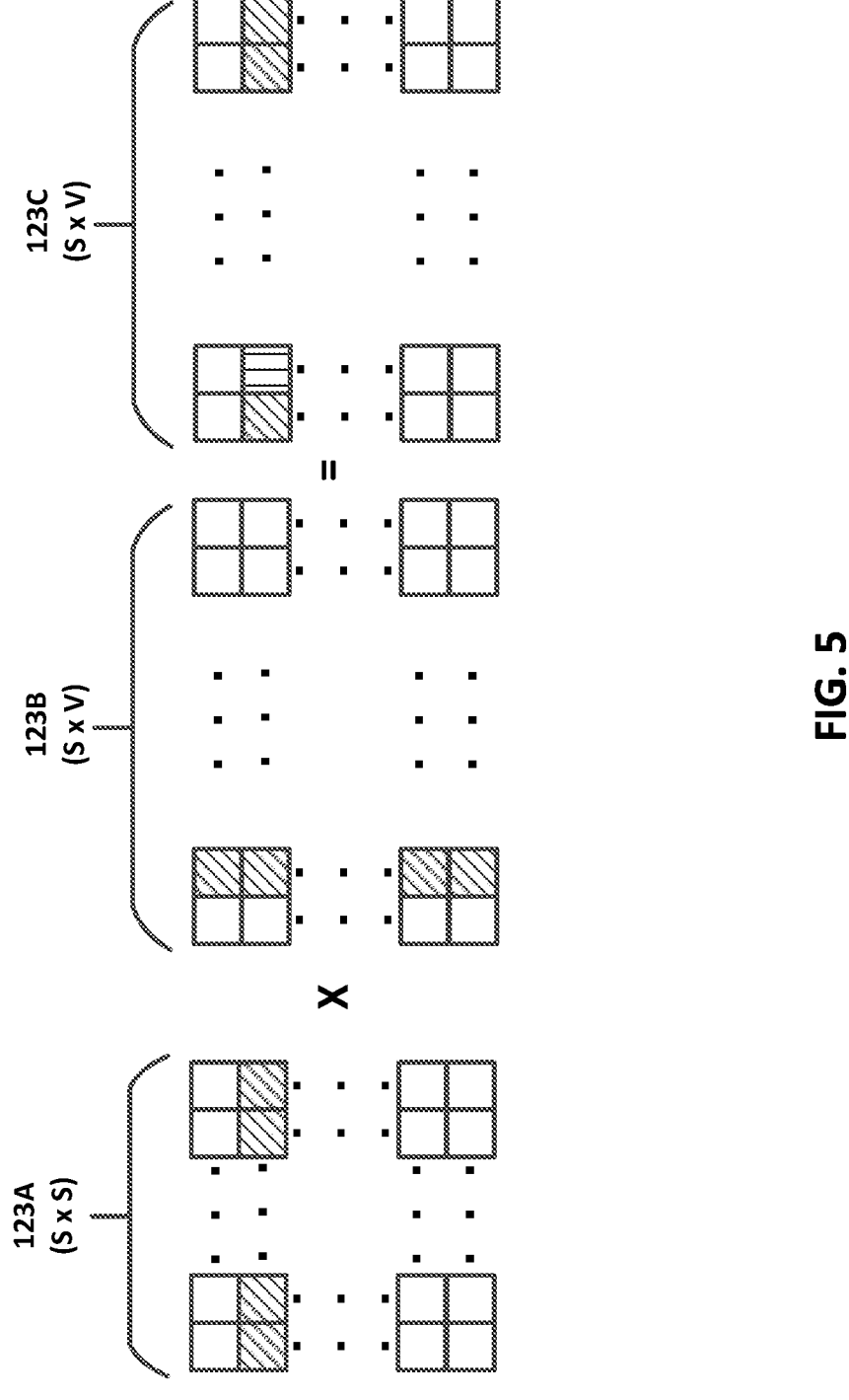
FIG. 5 illustrates an example of an invertible matrix, an orthogonal matrix generated based on decomposing a gradient, and a resulting matrix from performing a cross product of the invertible matrix and the orthogonal matrix.

As one example, and with reference to FIG. 5, an example Z invertible matrix 123A (of size S by S) is illustrated being crossed with an example Q orthogonal matrix 123B (of size S by V), resulting in an example $\nabla0$ matrix 123C (of size S by V). The second row of $\nabla0$ matrix 123C (illustrated with shading) is the result of the cross product of the second row of Z invertible matrix 123A (illustrated with shading) and the second column of Q orthogonal matrix 123B (illustrated with shading). Further, the second row of $\nabla0$ matrix 123C includes a separating value, indicated by the vertical shading of the cell in the second row and second column (as opposed to the diagonal shading of the other cells of the second row. The second row of $\nabla0$ matrix 123C can be determined to have a separating value based on one of the cells being differentiable with respect to all other cells of the row. For example, one of the cells of the second can be negative and all other cells of the row can be positive. This can indicate that the second column of Q orthogonal matrix 123B (having the same "second" index value) likewise has a separating value. It is noted that additional rows of $\nabla0$ matrix 123C can have separating values and, as a result, additional columns of Q can be determined to have additional separating values. However, only one such example is illustrated in FIG. 5 for simplicity. Further, it is noted that the matrices 123A, 123B, and 123C are only illustrated with some of their cells, as indicated by the ellipsis, for purposes of simplicity. Various dimensioned matrices can be provided, and the dimensions will be dependent on the corresponding vocabulary size and sequence length, as described herein.

Turning again to FIG. 3, at block 256A4, the system generates a reconstruction of the prediction, using the column(s) of Q determined to include a separating classifier and a mapping of the columns of Q to the vocabulary of the machine learning models. In some implementations, block 256A4 includes sub-block 256A4A and optionally sub-block 256A4B. At sub-block 256A4A, the system generates a bag of vocabulary reconstruction which can include an unordered listing of those elements of the vocabulary that correspond to the columns of Q determined to include a separating classifier.

At sub-block 256A4B, the system generates, optionally using the current state of model and using the bag of vocabulary reconstruction of sub-block 256A4A, an ordered sequence reconstruction. It is noted that the current state of the model is not utilized in generating the bag of vocabulary reconstruction at sub-block 256A4A. In some implementations, at sub-block 256A4B, the system does not utilize the current state of the model but, rather, relies on the bag of vocabulary reconstruction and a vocabulary model that dictates probabilities of various sequences of the vocabulary elements. For example, where the vocabulary includes words or word sequences, the vocabulary model can be a language model. For example, the system can utilize the language model to determine which, of multiple candidate ordered sequences of the bag of vocabulary reconstruction, is most probable, and that candidate ordered sequence utilized as the ordered sequence reconstruction. In some implementations, at sub-block 256A4B, the system generates the ordered sequence reconstruction based on the bag of vocabulary reconstruction and further based on the corresponding current weights of the machine learning model when the corresponding prediction was generated. Optionally, in those implementations the system uses gradients matching reconstruction technique and/or other reconstruction technique(s), that rely on corresponding current weights, in generating the ordered sequence reconstructions. However, the system uses such reconstruction technique(s) with a search space that is constrained in view of (e.g., constrained to) the bag of vocabulary reconstruction.

At block 256A5, the system stores the reconstruction, generated at block 256A4, and an association of the reconstruction to the gradient utilized in generating the reconstruction.

Implementations of the example of block 256A, that is illustrated in FIG. 3, can be motivated based on knowledge that $\nabla W = A^T \nabla 0$. In the preceding equation, $\nabla W$ represents the gradient, which is with respect to the weight matrix (W) of a corresponding projection layer. Further, $A^T$ represents the transpose of the projection input (i.e., the dimensions of the embedding(s) as well as a length of the sequence of the embedding(s)). Finally, $\nabla 0$ represents the gradient with respect to the projection output, which is unknown but can be resolved as described herein. By decomposing $\nabla W$ into $P\Sigma Q$, $P\Sigma Q$ can be rewritten as $P\Sigma (Z^{-1}Z)Q$, where Z is any S by S invertible matrix, and further rewritten as $(P\Sigma Z^{-1})(ZQ)$. With the preceding, $(P\Sigma Z^{-1})$ is equivalent to $A^T$, meaning that $\nabla 0$ is equal to (ZQ) and, thus, $\nabla 0$ can be resolved by a cross product of Z and Q. Moreover, a row in $\nabla 0$ that includes a separating value (e.g., a negative value) will indicate that a column of Q, having the same index value as the row, likewise has a separating value. This indicates that an element, of the vocabulary, that corresponds to that column of Q, was included in the prediction used to generate the gradient $\nabla W$. Through identification of the column(s) of Q that have separating values, and mapping those columns to element(s) of the known vocabulary for Q, a bag—of vocabulary reconstruction can be generated. It is noted that this general technique still applies for multi-sample/batch gradients and/or for multi-step gradients. In both cases $\Delta W$ is the sum of several updates $\Delta W_i$ and matrix factorization still works (e.g., the sum of products is still a product).

Figure 4:
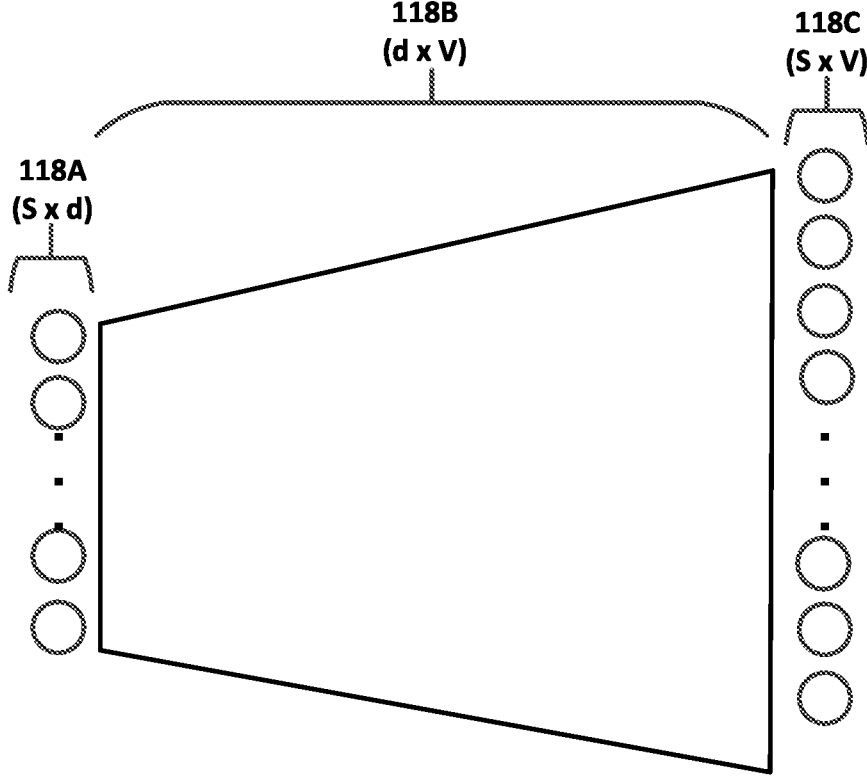
FIG. 4 illustrates an example of a projection layer of a machine learning model.

FIG. 4 illustrates an example of a projection layer of a machine learning model, such as global model 118 (FIG. 1) and local models 108A-N(FIG. 1). The projection layer includes a projection input layer 118A, weight matrix layer(s) 118B, and a projection output layer 118C. The projection input layer 118A can accept a lower dimensional generated embedding (of dimension d) as input and the weight matrix layer(s) 118B can be used to process the generated embedding, using current weights of the weight matrix layer(s) 118B, to generate corresponding projection output (of dimension V) of the projection output layer 118C. The projection output layer 118C has a size (V) that conforms to a vocabulary for the machine learning model. Put another way, the quantity of output nodes of the projection output layer 118C can conform to the vocabulary size and each node will correspond to a particular discrete element of the vocabulary. The output generated over the projection output layer 118C can be, for example, a probability distribution over the vocabulary. When a sequence of inputs of length S (indicated by the "S" in "Sxd" in FIG. 4) is applied to the projection input layer 118A, a sequence of outputs of length S (indicated by the "S" in "SxV" in FIG. 4) can be generated over the projection output layer 118C and will be of a size that conforms to the vocabulary and to a length of the input sequence.

Figure 6:
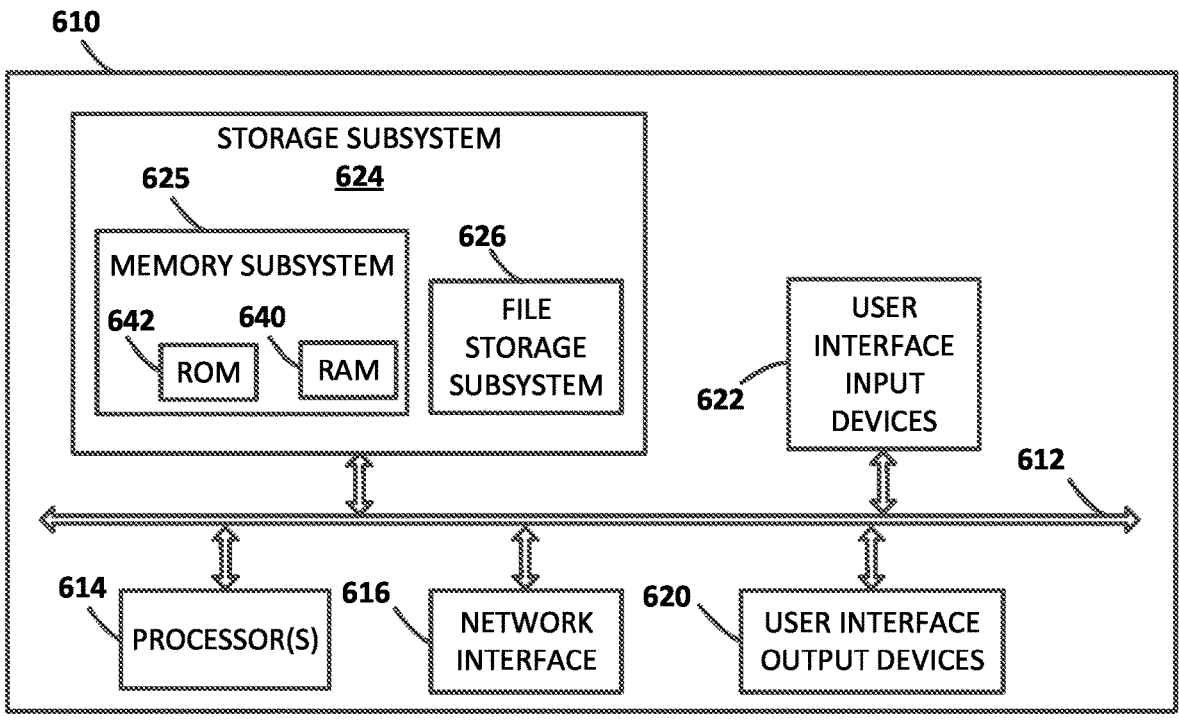
FIG. 6 schematically depicts an example architecture of a computer system.

FIG. 6 is a block diagram of an example computing device 610 that may optionally be utilized to perform one or more aspects of techniques described herein. For example, a client device can include one or more aspects of the example computing device 610 and/or a server can include one or more aspects of the example computing device 610. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 2, 3, and/or other methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes receiving a plurality of model update, prediction(s) pairs. Each of the model update, prediction(s) pairs include: (a) at least one corresponding prediction, generated based on processing a corresponding input using a machine learning model with corresponding current weights; and (b) a corresponding model update generated based on at least one gradient, where the at least one gradient is generated based on applying a particular loss technique and generated based at least in part on the corresponding prediction and a corresponding ground truth output. The method further includes, for each of the model update, prediction(s) pairs: generating, using the corresponding model update and a known vocabulary of a projection output of the machine learning model, a reconstruction of the corresponding prediction; and generating, based on comparing the reconstruction to the corresponding prediction, a corresponding measure that reflects a degree of conformity between the reconstruction to the corresponding prediction. Generating the reconstruction is performed independent of the corresponding prediction. The method further includes determining, based on the corresponding measures for the model update, prediction(s) pairs, whether to utilize the particular loss technique in federated training of the machine learning model or of an additional machine learning model.

These and other implementations of the technology can include one or more of the following features.

In some implementations, the method further includes, in response to determining to utilize the particular loss technique in federated training of the machine learning model or of the additional machine learning model: causing the machine learning model or the additional machine learning model to be locally stored on a plurality of client devices, along with corresponding instructions. The corresponding instructions cause the client devices to locally generate model updates, for the machine learning model or the additional machine learning model, using the particular loss techniques, and transmit the model updates to one or more remote servers.

In some implementations, determining, based on the corresponding measures, whether to utilize the particular loss technique in federated training of the machine learning model or of an additional machine learning model includes: generating an overall measure based on the corresponding measures; comparing the overall measure to a threshold; and determining to utilize the particular loss technique in federated training in response to the overall measure satisfying the threshold.

In some implementations, determining, based on the corresponding measures, whether to utilize the particular loss technique in federated training of the machine learning model or of an additional machine learning model includes: generating an overall measure based on the corresponding measures; comparing the overall measure to an alternate overall measure, the alternate overall measure generated based on alternate model update, prediction(s) pairs having alternate corresponding model updates generated based on an alternate particular loss technique that differs from the particular loss technique; and determining, in response to the comparing, to utilize the particular loss technique in federated training. In some versions of those implementations, the particular loss technique is cross-entropy loss without any gradient modification technique and the alternate particular loss technique is cross-entropy loss with at least one gradient modification technique. In some of those versions, the at least one gradient modification technique includes sign gradient descent and/or adaptive federated optimization. In some other versions of those implementations, the particular loss technique is cross-entropy loss with a first gradient modification technique (or a first combination of gradient modification techniques) and the alternate particular loss technique is cross-entropy loss with a second gradient modification technique (or a second combination of gradient modification techniques).

In some implementations, generating, using the corresponding model update and known labels of a projection output of the machine learning model, the reconstruction of the corresponding prediction, includes generating the reconstruction using matrix factorization on the model update and using the known vocabulary of projection output of the machine learning model. The reconstruction can include (e.g., be restricted to) a bag of vocabulary reconstruction. The reconstruction can additionally or alternatively include an ordered sequence reconstruction and generating the reconstruction can further include generating the ordered sequence reconstruction using the corresponding current weights of the model.

In some versions of those implementations, generating the reconstruction using matrix factorization on the model update and using a known vocabulary of projection output of the machine learning model includes: decomposing the model update into an S by V orthogonal matrix, where S corresponds to a number of sequences in the prediction and where V corresponds to a size of the known vocabulary; determining which columns, in the S by V orthogonal matrix, include a separating classifier; and generating the reconstruction using the columns, determined to include the separating classifier, and a mapping of the columns to the known vocabulary. In some of those versions, determining which columns, in the S by V orthogonal matrix, include the separating classifier, includes: performing a dot product of the S by V orthogonal matrix and an S by S invertible matrix; and determining, based on analysis of rows of the resulting matrix from the dot product, which rows include a negative value; and determining the columns include the separating classifier based on the columns corresponding to (e.g., having the same index value as) the rows that include the negative value.

In some implementations, a method implemented by one or more processors is provided and includes receiving, via a network, a request from a computing device. The request includes a plurality of model update, prediction(s) pairs. Each of the model update, prediction(s) pairs include: (a) at least one corresponding prediction, generated based on processing a corresponding input using a machine learning model with corresponding current weights; and (b) a corresponding model update generated based on at least one gradient, where the at least one gradient is generated based on applying a particular loss technique and generated based at least in part on the corresponding prediction and a corresponding ground truth output. The method further includes, for each of the model update, prediction(s) pairs: generating, using the corresponding model update and a known vocabulary of a projection output of the machine learning model, a reconstruction of the corresponding prediction; and generating, based on comparing the reconstruction to the corresponding prediction, a corresponding measure that reflects conformity of the reconstruction to the corresponding prediction. Generating the reconstruction is performed independent of the corresponding prediction. The method further includes transmitting, via the network and to the computing device in response to the request, the corresponding measures for the model update, prediction(s) pairs, and/or an overall measure based on the corresponding measures.

In some implementations, a method implemented by one or more processors is provided and includes receiving, via a network, a request from a computing device. The request includes a plurality of model updates. Each of the model updates is generated based on applying a particular loss technique and based at least in part on a corresponding prediction and a corresponding ground truth output. The corresponding prediction is generated based on processing a corresponding input using a machine learning model with corresponding current weights. The method further includes, for each of the model updates, generating, using the corresponding model update and a known vocabulary of a projection output of the machine learning model, a reconstruction of the corresponding prediction. Generating the reconstruction is performed independent of the corresponding prediction. The method further includes transmitting, via the network and to the computing device in response to the request, the reconstructions of the corresponding predictions.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

receiving a plurality of model update, prediction(s) pairs, each of the model update, prediction(s) pairs including:

at least one corresponding prediction, generated based on processing a corresponding input using a machine learning model with corresponding current weights;

a corresponding model update generated based on at least one gradient, the at least one gradient generated based on applying a particular loss technique and generated based at least in part on the corresponding prediction and a corresponding ground truth output, and the corresponding model update having been used in updating weights of the machine learning model;

for each of the model update, prediction(s) pairs:

generating, using the corresponding model update used in updating weights of the machine learning model and a known vocabulary of a projection output of the machine learning model, a reconstruction of the corresponding prediction, wherein generating the reconstruction is performed independent of the corresponding prediction; and generating, based on comparing the reconstruction of the corresponding prediction to the corresponding prediction used in generating the corresponding model update used in updating weights of the machine learning model, a corresponding measure that reflects a degree of conformity between the reconstruction and the corresponding prediction;

determining, based on the corresponding measures for the model update, prediction(s) pairs, whether to utilize the particular loss technique in federated training of the machine learning model or of an additional machine learning model.

2. The method of claim 1, further comprising:

in response to determining to utilize the particular loss technique in federated training of the machine learning model or of the additional machine learning model:

causing the machine learning model or the additional machine learning model to be locally stored on a plurality of client devices, along with corresponding instructions that cause the client devices to:

locally generate model updates, for the machine learning model or the additional machine learning model, using the particular loss techniques, and transmit the model updates to one or more remote servers.

3. The method of claim 1, wherein determining, based on the corresponding measures, whether to utilize the particular loss technique in federated training of the machine learning model or of an additional machine learning model comprises:

generating an overall measure based on the corresponding measures;

comparing the overall measure to a threshold; and determining to utilize the particular loss technique in federated training in response to the overall measure satisfying the threshold.

4. The method of claim 1, wherein determining, based on the corresponding measures, whether to utilize the particular loss technique in federated training of the machine learning model or of an additional machine learning model comprises:

generating an overall measure based on the corresponding measures;

comparing the overall measure to an alternate overall measure, the alternate overall measure generated based on alternate model update, prediction(s) pairs having alternate corresponding model updates generated based on an alternate particular loss technique that differs from the particular loss technique; and determining, in response to the comparing, to utilize the particular loss technique in federated training.

5. The method of claim 4, wherein the particular loss technique is cross-entropy loss without any gradient modification technique and wherein the alternate particular loss technique is cross-entropy loss with at least one gradient modification technique.

6. The method of claim 5, wherein the at least one gradient modification technique includes sign gradient descent, gradient sparsification, and/or adaptive federated optimization.

7. The method of claim 1, wherein generating, using the corresponding model update and known labels of a projection output of the machine learning model, the reconstruction of the corresponding prediction, comprises:

generating the reconstruction using matrix factorization on the model update and using the known vocabulary of the projection output of the machine learning model.

8. The method of claim 7, wherein the reconstructions includes a bag of vocabulary reconstruction.

9. The method of claim 7, wherein generating the reconstruction using matrix factorization on the model update and using the known vocabulary of the projection output of the machine learning model comprises:

decomposing the model update into an S by V orthogonal matrix, wherein S corresponds to a number of sequences in the prediction(s) pairs and wherein V corresponds to a size of the known vocabulary;

determining which columns, in the S by V orthogonal matrix, include a separating classifier; and generating the reconstruction using the columns, determined to include the separating classifier, and a mapping of the columns to the known vocabulary.

10. The method of claim 9, wherein determining which columns, in the S by V orthogonal matrix, include the separating classifier, comprises:

performing a dot product of the S by V orthogonal matrix and an S by S invertible matrix; and determining, based on analysis of rows of a resulting matrix from the dot product, which rows include a negative value; and determining the columns include the separating classifier based on the columns corresponding to the rows that include the negative value.

11. The method of claim 7, wherein the reconstructions includes an ordered sequence reconstruction and wherein generating the reconstruction further comprises generating the ordered sequence reconstruction using the corresponding current weights of the machine learning model.

12. A method implemented by one or more processors, the method comprising:

receiving, via a network, a request from a computing device, wherein the request includes a plurality of model update, prediction(s) pairs, each of the model update, prediction(s) pairs including:

at least one corresponding prediction, generated based on processing a corresponding input using a machine learning model with corresponding current weights; and a corresponding model update generated based on at least one gradient, the at least one gradient generated based on applying a particular loss technique and generated based at least in part on the corresponding prediction and a corresponding ground truth output, and the corresponding model update having been used in updating weights of the machine learning model;

for each of the model update, prediction(s) pairs:

generating, using the corresponding model update used in updating weights of the machine learning model and a known vocabulary of a projection output of the machine learning model, a reconstruction of the corresponding prediction, wherein generating the reconstruction is performed independent of the corresponding prediction; and generating, based on comparing the reconstruction of the corresponding prediction to the corresponding prediction used in generating the corresponding model update used in updating weights of the machine learning model, a corresponding measure that reflects conformity of the reconstruction to the corresponding prediction;

transmitting, via the network and to the computing device in response to the request:

the corresponding measures for the model update, prediction(s) pairs, and/or an overall measure based on the corresponding measures.

13. The method of claim 12, wherein generating, using the corresponding model update and known labels of the projection output of the machine learning model, the reconstruction of the corresponding prediction, comprises:

generating the reconstruction using matrix factorization on the model update and using the known vocabulary of the projection output of the machine learning model.

14. The method of claim 13, wherein the reconstructions includes a bag of vocabulary reconstruction.

15. The method of claim 14, wherein the reconstructions includes an ordered sequence reconstruction and wherein generating the reconstruction further comprises generating the ordered sequence reconstruction using the corresponding current weights of the model and the bag of vocabulary reconstruction.

16. The method of claim 13, wherein generating the reconstruction using matrix factorization on the at least one gradient and using the known vocabulary of the projection output of the machine learning model comprises:

decomposing the model update into an S by V orthogonal matrix, wherein S corresponds to a number of sequences in the prediction(s) pairs and wherein V corresponds to a size of the known vocabulary;

determining which columns, in the S by V orthogonal matrix, include a separating classifier; and generating the reconstruction using the columns, determined to include the separating classifier, and a mapping of the columns to the known vocabulary.

17. The method of claim 16, wherein determining which columns, in the S by V orthogonal matrix, include the separating classifier, comprises:

performing a dot product of the S by V orthogonal matrix and an S by S invertible matrix; and determining, based on analysis of rows of a resulting matrix from the dot product, which rows include a negative value; and determining the columns include the separating classifier based on the columns corresponding to the rows that include the negative value.

18. A method implemented by one or more processors, the method comprising:

receiving, via a network, a request from a computing device, wherein the request includes a plurality of model updates, wherein each of the model updates is generated based on applying a particular loss technique and based at least in part on corresponding prediction (s) and corresponding ground truth output(s), wherein the corresponding prediction(s) are generated based on processing corresponding input(s) using a machine learning model with corresponding current weights, and wherein the plurality of model updates have been used in updating weights of the machine learning model;

for each of the model updates:

generating, using the corresponding model update used in updating weights of the machine learning model and a known vocabulary of a projection output of the machine learning model, a reconstruction of the corresponding prediction(s), wherein generating the reconstruction is performed independent of the corresponding prediction(s); and transmitting, via the network and to the computing device in response to the request:

the reconstructions of the corresponding predictions.

19. The method of claim 18, wherein generating, using the corresponding model update and known labels of the projection output of the machine learning model, the reconstruction of the corresponding prediction, comprises:

generating the reconstruction using matrix factorization on the model update and using the known vocabulary of the projection output of the machine learning model.

20. The method of claim 18, wherein the reconstructions includes a bag of vocabulary reconstruction.

* * * * *